US012186830B1

(12) United States Patent
Rife

(10) Patent No.: US 12,186,830 B1
(45) Date of Patent: Jan. 7, 2025

(54) ROTARY LASER ENGRAVING DEVICE

(71) Applicant: Jason Earl Rife, Jacksonville, FL (US)

(72) Inventor: Jason Earl Rife, Jacksonville, FL (US)

(73) Assignee: JER CUSTOM DESIGNS, INC., Jacksonville, FL (US)

( * ) Notice: Subject to any disclaimer, the term of this patent is extended or adjusted under 35 U.S.C. 154(b) by 847 days.

(21) Appl. No.: 17/348,446

(22) Filed: Jun. 15, 2021

Related U.S. Application Data

(60) Provisional application No. 63/039,019, filed on Jun. 15, 2020.

(51) Int. Cl.
*B23K 26/08* (2014.01)
*B23K 26/362* (2014.01)
*B44B 3/04* (2006.01)
*B44B 3/06* (2006.01)

(52) U.S. Cl.
CPC ........ *B23K 26/0823* (2013.01); *B23K 26/362* (2013.01); *B44B 3/04* (2013.01); *B44B 3/065* (2013.01); *B44B 2700/025* (2013.01)

(58) Field of Classification Search
CPC .... B23K 26/0823; B23K 26/362; B44B 3/04; B44B 3/065; B44B 2700/025
See application file for complete search history.

(56) References Cited

U.S. PATENT DOCUMENTS

| | | | |
|---|---|---|---|
| 3,110,966 A | 11/1963 | Hillig | |
| 3,789,732 A | 2/1974 | Levine | |
| 3,894,475 A | 7/1975 | Varga | |
| 4,742,206 A * | 5/1988 | Dietterich | B23K 26/0823 219/121.78 |

(Continued)

FOREIGN PATENT DOCUMENTS

CN 1188048 7/1998

OTHER PUBLICATIONS

PiBurn: Rotary Attachment for Laser Engravers, Apr. 23, 2019, Kickstarter (Year: 2019).*

(Continued)

*Primary Examiner* — Dana Ross
*Assistant Examiner* — Kristina J Babinski
(74) *Attorney, Agent, or Firm* — Lippes Mathias LLP; Mitchell Ghaneie; Josephine Chen

(57) ABSTRACT

A rotary laser engraving device for supporting and rotating an object to be engraved during a laser engraving process is provided and includes a support frame. The support frame may include a central bar, a stationary vertical post and a movable post movable along a length of the central bar. A first support assembly is movably mounted on the frame, such as on the stationary vertical post, and includes a first pair of rollers for supporting a first end of the object to be engraved. A second support assembly is movably mounted on the frame, such as on the movable post, and includes a second pair of rollers for supporting a second end of the object to be engraved. At least one longitudinal adjustment mechanism and at least one vertical adjustment mechanism are carried by the frame and allow to adjust the longitudinal and vertical separation, respectively, between the first and second pairs of rollers. A motor assembly is provided to rotate one of the first and second pairs of rollers to rotate the object to be engraved.

19 Claims, 8 Drawing Sheets

(56) References Cited

U.S. PATENT DOCUMENTS

| | | | |
|---|---|---|---|
| 5,224,716 | A | 7/1993 | Saeda et al. |
| 6,984,803 | B1 | 1/2006 | Garnier et al. |
| 7,726,220 | B2 | 6/2010 | Masters et al. |
| 8,253,065 | B2 | 8/2012 | Zhang et al. |
| 9,266,193 | B2 | 2/2016 | Liu et al. |
| 9,492,892 | B2 | 11/2016 | Liu et al. |
| 9,902,019 | B2 | 2/2018 | Schwartz |
| 2002/0119399 | A1 | 8/2002 | Leskanic |
| 2006/0096473 | A1 | 5/2006 | Beisswenger et al. |
| 2019/0118290 | A1 | 4/2019 | Li |

OTHER PUBLICATIONS

"Piburn Laser Rotary Attachment", User manual, Apr. 16, 2019, https://www.lensdigital.com/home/piburn-support/.
"The story of PiBurn", https://www.lensdigital.com/home/the-story-of-piburn/.

\* cited by examiner

ROTARY LASER ENGRAVING DEVICE

CROSS-REFERENCE TO RELATED APPLICATION

This application claims the benefit of U.S. Provisional Patent Application No. 63/039,019, filed on Jun. 15, 2020, which is incorporated herein by reference in its entirety.

FIELD OF THE INVENTION

The present invention relates generally to rotary laser engraving devices, and more particularly, to a rotary laser engraving device having a multitude of adjustments to rotate and adjustably support various shapes and sizes of objects to be engraved during a laser engraving procedure.

BACKGROUND OF THE INVENTION

It is often desirable to engrave many different objects with various logos, images, etc. For example, it is often desirable to engrave promotional items with a company's name or logo for presentation to customers. Other items, such as souvenirs, toys, and the like, can also benefit from engraving of information or indicia indicating the items origin or purpose.

Laser engraving is a cost effective way of engraving these types of items. Often it is necessary to move or rotate the object as it is being engraved by a laser to gain the desired coverage on the object. Devices are known to rotate the objects as they are engraved, but many such devices do not have the capacity to easily accommodate objects of varying lengths, often requiring bolting and unbolting of support members when changing between differing objects to be engraved. This is a time consuming and costly process, often reducing the numbers of items that can be easily engraved.

Additionally, many objects to be engraved have irregular shapes or varying diameters along their lengths, requiring differing end supports to properly position the objects on the engraving devices. This too requires costly and time consuming adjustments to the engraving devices to change from one object to be engraved to another.

Accordingly, there is need for a solution to at least one of the aforementioned problems. For instance, there is an established need for rotary laser engraving device that is easily adjustable to accommodate various lengths of objects to be engraved. There is a further need for a laser engraving device that is easily adjustable to accommodate objects having various shapes and/or varying diameters. There is still further a need for a rotary laser engraving devices that can accommodate all of these adjustments easily and with a minimal amount of effort on the part of the user.

SUMMARY OF THE INVENTION

The present invention is directed to a rotary laser engraving device for supporting and rotating an object to be engraved during a laser engraving process. The rotary laser engraving device includes a support frame which may include a central bar, a stationary vertical post and a movable post movable along a length of the central bar. A first support assembly is movably mounted on the frame, such as on the stationary vertical post, and includes a first pair of rollers for supporting a first end of the object to be engraved. A second support assembly is movably mounted on the frame, such as on the movable post, and includes a second pair of rollers for supporting a second end of the object to be engraved. At least one longitudinal adjustment mechanism and at least one vertical adjustment mechanism are carried by the frame and allow to adjust the longitudinal and vertical separation, respectively, between the first and second pairs of rollers. A motor assembly is provided to rotate one of the first and second pairs of rollers to rotate the object to be engraved.

In a first implementation of the invention, a rotary laser engraving device for retaining and rotating objects to be engraved, the rotary laser engraving device comprises a frame, a first support assembly mounted on the frame and including a pair of driven rollers for supporting a first end of an object to be engraved, and a second support assembly mounted on the frame and having a pair of free rollers for supporting a second end of the object to be engraved. The device further includes at least one longitudinal adjustment mechanism connected to the frame and configured to move at least one of the first support assembly and second support assembly longitudinally along the frame to vary a distance between the first and second pairs of driven rollers. In addition, the device comprises at least one vertical adjustment mechanism connected to the frame and configured to move at least one of the first support assembly and second support assembly vertically along the frame to vary a vertical separation between the first and second pairs of driven rollers. Further included in the device is a motor assembly engageable with the pair of driven rollers to rotate the pair of driven rollers to rotate the object to be engraved.

In another implementation of the invention, a rotary laser engraving device for retaining and rotating objects to be engraved may include a frame, a first support assembly and a second support assembly. The first support assembly may be mounted on the frame and may include a first set of rollers for supporting a first end of an object to be engraved. The second support assembly may be mounted on the frame and may include a second set of rollers for supporting a second end of the object to be engraved. The device may further include a longitudinal adjustment mechanism, which may be carried by the frame and configured to move at least one of the first support assembly and second support assembly in a longitudinal direction along the frame to vary a longitudinal separation between the first set of rollers and the second set of rollers. The device may further comprise least one vertical adjustment mechanism, which may be carried by the frame and configured to move at least one of the first support assembly and second support assembly vertically along the frame to vary a vertical separation between the first set of rollers and the second set of rollers. Furthermore, a motor assembly may engage with the first set of rollers to rotate the first set of rollers to rotate the object to be engraved.

In a second aspect, the first set of rollers and second set of rollers may be arranged facing one another. The rollers of the first and second sets of rollers may be rotatable about respective rotation axes which may be parallel to one another.

In another aspect, the at least one vertical adjustment mechanism may include at least one spring-loaded clamp configured to bias the object to be engraved against at least one of the first and second sets of rollers.

In another aspect, the at least one spring-loaded clamp may include a clamp arm pivotable relative to and spring-biased towards said at least one of the first and second sets of rollers. The clamp arm may carry a clamp wheel configured to abut against and roll on the object to be engraved.

In another aspect, the frame may include a central bar arranged in the longitudinal direction, a first support post extending vertically upward relative to the central bar and carrying the first support assembly, and a second support post extending vertically upward relative to the central bar and carrying the second support assembly. At least one of the first support post and the second support post may be longitudinally movable along the central bar to vary the longitudinal separation between the first set of rollers and the second set of rollers.

In yet another aspect, the at least one vertical adjustment mechanism may include a vertical adjustment mechanism carried by the frame and configured to move the first support assembly along the first support post.

In another aspect, the motor assembly may be movable along the first support post jointly with the first support assembly.

In another aspect, the vertical adjustment mechanism configured to move the first support assembly may include a lead screw and a threaded collar. The lead screw may be arranged vertically. The threaded collar may be threaded to the lead screw and affixed to the first support assembly, and may be configured to translate vertically jointly with the first support assembly upon rotation of the lead screw.

In another aspect, the vertical adjustment mechanism configured to move the first support assembly may include a spring-loaded clamp configured to bias the object to be engraved against the first set of rollers.

In yet another aspect, the spring-loaded clamp may include a clamp arm pivotable relative to and spring-biased towards the first set of rollers. The clamp arm may carry a clamp wheel configured to abut against and roll on the object to be engraved.

In another aspect, the first support post may be non-longitudinally movable relative to the central bar, and the second support post may be longitudinally movable along the central bar.

In another aspect, the longitudinal adjustment mechanism may include a lead screw arranged in the longitudinal direction and a threaded collar threaded to the lead screw. The threaded collar may be affixed to the second support post and configured to translate in the longitudinal direction jointly with the second support post upon rotation of the lead screw.

In another aspect, the at least one vertical adjustment mechanism may include a vertical adjustment mechanism carried by and longitudinally movable jointly with the second support post and configured to move the second support assembly along the second support post.

In yet another aspect, the vertical adjustment mechanism carried by the second support post may include a lead screw and a threaded collar. The lead screw may be arranged vertically. The threaded collar may be threaded to the lead screw and affixed to the second support assembly, and may be configured to translate vertically jointly with the second support assembly upon rotation of the lead screw.

In another aspect, the frame further may include a first transverse bar and a second transverse bar arranged in spaced-apart relationship and extending perpendicularly to the central bar.

In another aspect, the first and second transverse bars may be configured to stably rest on a horizontal surface.

In another aspect, the motor assembly may include a motor and a drive belt engageable with the motor, the drive belt engaging and rotating the first set of rollers.

In yet another aspect, the motor assembly may further include a tensioner to tension the drive belt against the first set of rollers.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present invention is directed toward rotary laser engraving device having horizontal and vertically adjustable supports to accommodate various sizes and shapes of objects to be engraved.

Figure 1:
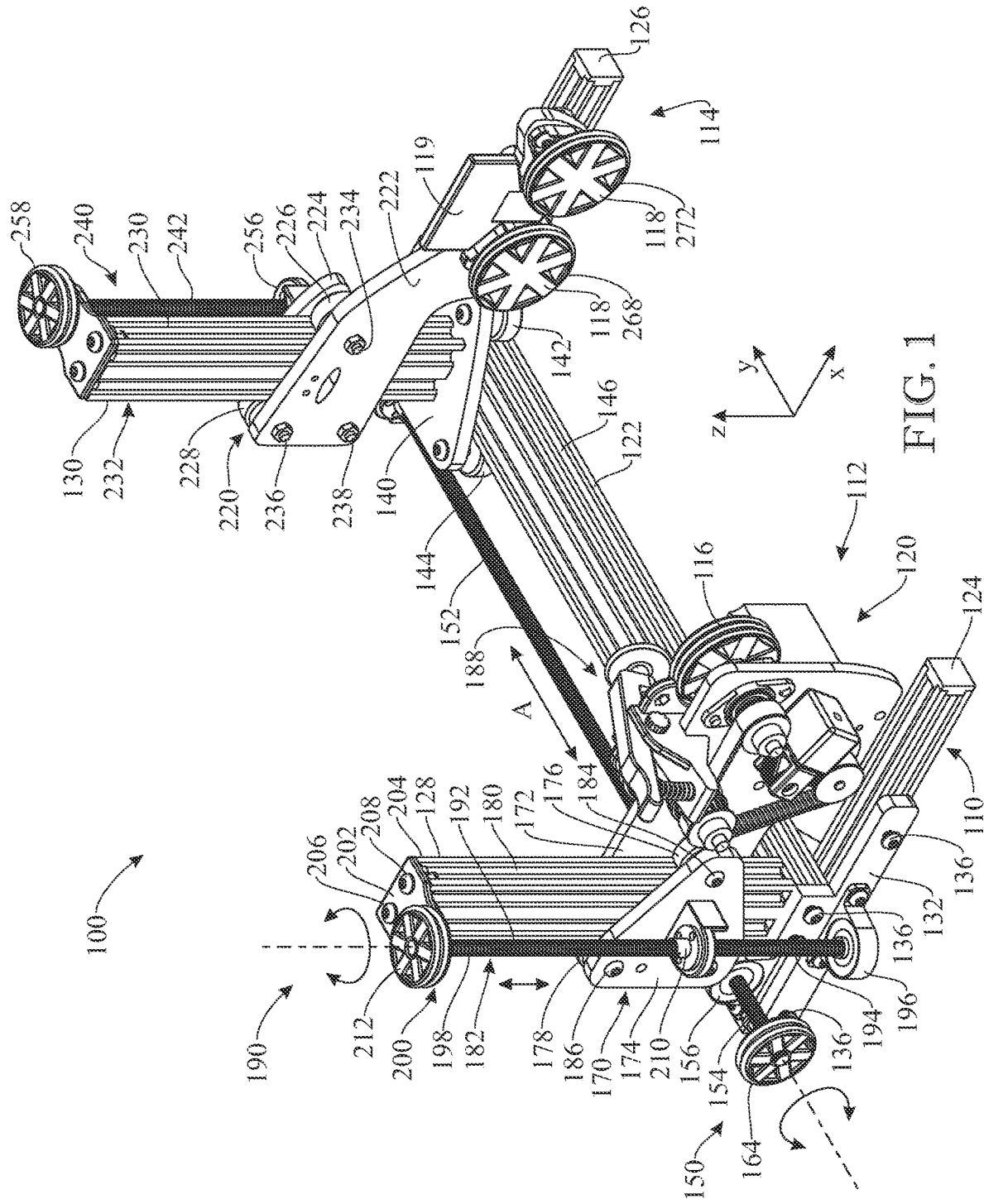
FIG. 1 presents a top, front isometric view of a rotary laser engraving device in accordance with an illustrative embodiment of the present invention, the device including a frame, a first support assembly for rotatably supporting a first end of an object to be engraved and a second support assembly for rotatably supporting a second end of the object to be engraved, the second support assembly being vertically and horizontally movable relative to the first support assembly.
Figure 2:
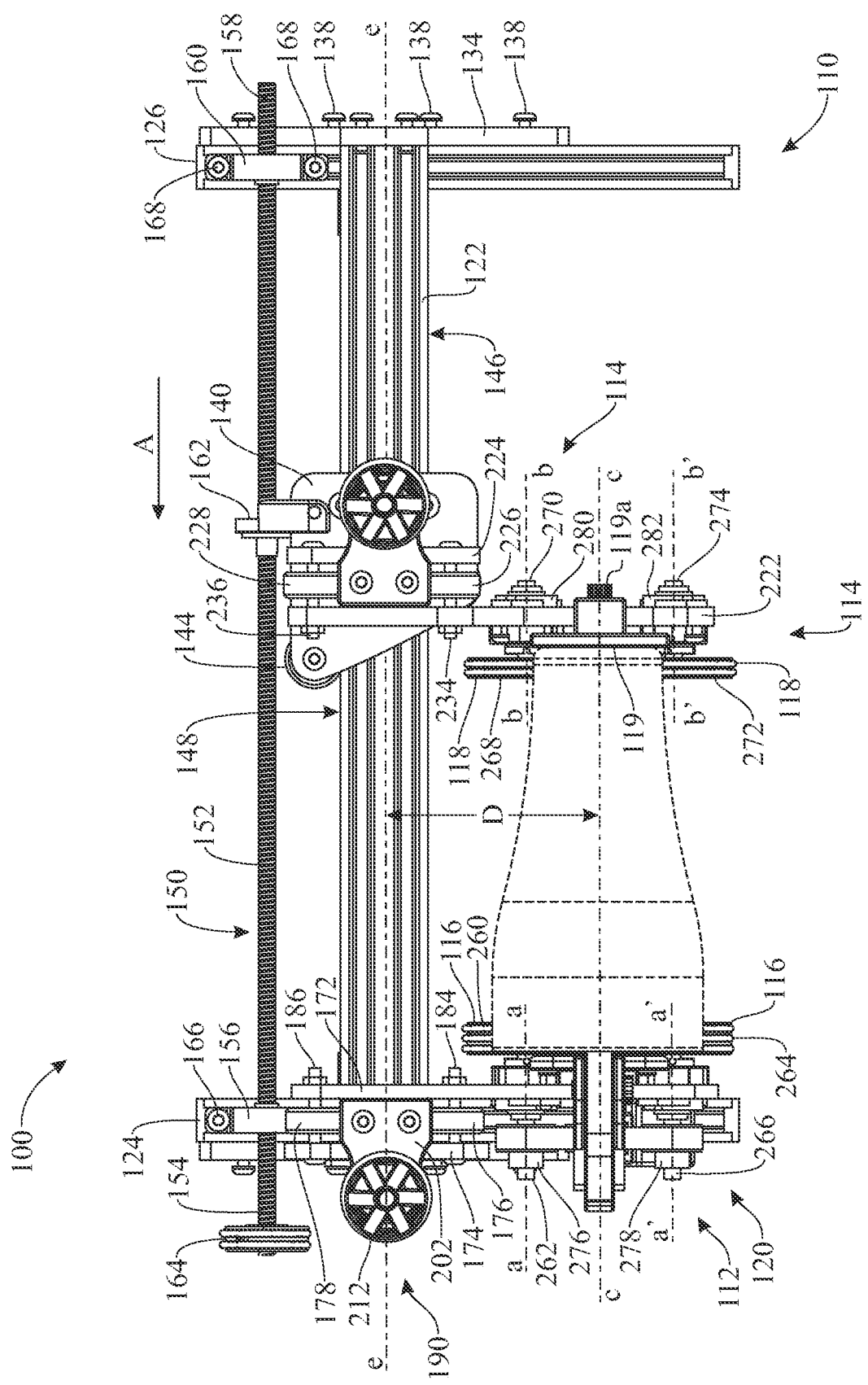
FIG. 2 presents a top plan view of the rotary laser engraving device of FIG. 1, with the object to be engraved fully supported on the first and second support assemblies.

Referring initially to FIGS. 1 and 2, a rotary laser engraving device 100 is illustrated in accordance with an exemplary embodiment of the present invention. The rotary laser engraving device 100 generally includes a frame assembly 110, a first support assembly 112 movably mounted on the frame assembly 110 and a second support assembly 114 movably mounted on the frame assembly 110. The first support assembly 112 is movable relative to the frame assembly 110 in a vertical direction z. The second support assembly 114 is both movable relative to the frame assembly 110 in the vertical direction z and in a horizontal, longitudinal direction y perpendicular to the vertical direction z, to accommodate varying lengths of objects to be engraved as described in more detail hereinbelow.

Figure 6:
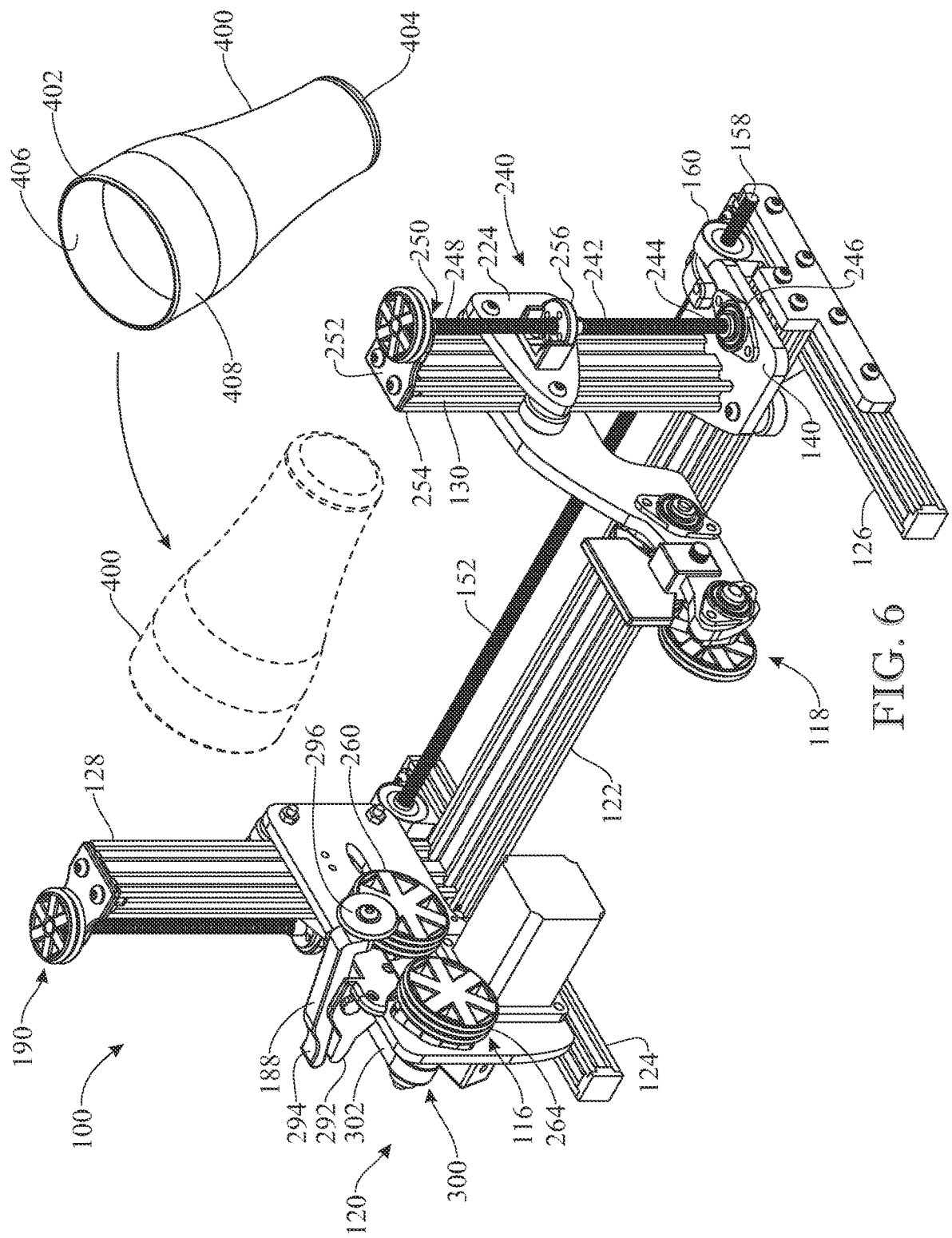
FIG. 6 presents a top, front isometric view of the rotary laser engraving device of FIG. 1, with an object to be engraved being initially inserted towards the first support assembly.

As shown in FIGS. 1 and 6, the first support assembly 112 includes a pair of driven rollers 116 for supporting and rotating a first end of an object to be engraved, while the second support assembly 114 includes a pair of free rollers 118 to allow the object to be engraved to rotate freely relative to the second support assembly. A motor assembly 120 is provided to rotate the pair of driven rollers 116 of the first support subassembly 112 and thus rotate the object to be engraved as it is being engraved by an associated laser mechanism (not shown).

In order to support the first and second support assemblies 112 and 114, respectively, the frame assembly generally includes a central rail or bar 122, which may be arranged in the longitudinal direction y. The central bar 122 may be affixed to a first transverse bar 124 and a second transverse bar 126. The first and second transverse bars 124 and 126 may extend in a horizontal, transverse direction x that is perpendicular to the longitudinal direction y and vertical direction z. The first and second transverse bars 124 and 126 may stabilize the central bar 122, and thus the entire rotary laser engraving device 100, during operation of the motor assembly 120 and the engraving process. A first or stationary support post 128 is affixed to the central bar 122 and extends in the vertical direction z. In turn, a second or movable support post 130 is mounted for movement along the length of the central bar 122, to adjust the separation between the stationary support post 128 and the movable support post 130. The second or movable support post 130 also extends in the vertical direction z. The first support assembly 112 and second support assembly 114 are vertically movably mounted to the first or stationary support post 128 and the second or movable support post 130, respectively. The movable support post 130 mounted for movement along the length of the central bar 122 allows to move the second support assembly 114 longitudinally relative to the first support assembly 112. The first transverse bar 124 is secured to the central bar 122 by a first anchor plate 132 and the second transverse bar 126 is secured to the central bar 122 by a second anchor plate 134 (FIG. 2). Bolts 136 secure the first transverse bar 124 to the central bar 112 and bolts 138 (FIG. 2) secure the second anchor plate 134 to the central bar 122. The first anchor plate 132 additionally fixedly secures the stationary support post 128 to the central bar 122 with additional bolts 136.

In a non-limiting example, the aforementioned bars 122, 124, and 126 and posts 128 and 130 may be manufactured by aluminum extrusion. For example, the central bar 122, the first or stationary support post 128 and the second or movable support post 130 may be 20/40 elongated, rectilinear aluminum extruded pieces, while the first and second transverse bars 124 and 126 may be 20/20 elongated, rectilinear aluminum extruded pieces. In some embodiments, some or all of said bars or posts 122, 124, 126, 128 and 130 may be commercially-available pieces that may be easily and conveniently cut to the desired length to achieve a desired shape and size of the rotary laser engraving device 100, in order, for instance, to rapidly and conveniently repair or re-size the device 100. Thus, an advantage of at least some embodiments of the invention is that on-site maintenance and repair of the device is facilitated.

As noted above, the movable support post 130 is mounted for longitudinal movement along the central bar 122 to move the second support assembly 114 longitudinally (i.e. in the longitudinal direction y) relative to the first support assembly 112 in order to accommodate objects to be engraved of various lengths. As can be seen in FIG. 1, the movable support post 130 may be fixedly mounted on a glide plate 140 which may, in turn, be slidably mounted to the central bar 122. The glide plate 140 includes freely rotatable wheels 142 and 144 which are rotatably mounted to the glide plate 140 and which ride within and along respective longitudinally extending tracks 146 and 148 formed in the central bar 122. In some embodiments, the freely rotatable wheels 142 and 144 may be V-slot wheels or rollers. While not specifically shown, in some embodiments, the glide plate 140 may include at least another freely rotatable wheel which rides in one of the longitudinally extending tracks 146 and 148 to better stabilize the glide plate 140 as it moves along the central bar 122.

With continued reference to FIG. 1, the rotary laser engraving device 100 of the present embodiment includes a longitudinal adjustment mechanism 150 configured to move the glide plate 140, and thus the movable support post 130 and the second support assembly 114, longitudinally along the central bar 122. The longitudinal adjustment mechanism 150 includes a lead screw 152 arranged along the longitudinal direction y and parallel to the central bar 122. A first end 154 of the lead screw 152 is rotatably mounted in a pillow block bearing 156 affixed to the first transverse bar 124. As shown in FIGS. 2 and 6, a second end 158 of the lead screw 152 is rotatably mounted in a pillow block bearing 160 affixed to the second transverse bar 126. A translational, yet non-rotational, internally-threaded anti-backlash nut or drive collar 162, shown for instance in FIG. 2, is affixed to the glide plate 140 and is threadingly mounted on the lead screw 152, such that rotation of the lead screw 152 causes a translation of the guide collar 162 along the lead screw 152, thus causing the glide plate 140 to move longitudinally along the lead screw 152 and thus along the central bar 122. As shown in FIGS. 1 and 2, a first adjustment wheel or knob 164 is affixed to the lead screw 152 to allow a user to easily rotate the lead screw 152 and thereby adjust the longitudinal position of the second support assembly 114 relative to the first support assembly 112. Bolts 166 and 168 (FIG. 2) are used to secure the bearings 156 and 160 to the first and second transverse bars 124 and 126, respectively.

Turning now to the first support assembly 112, as noted above, the first support assembly 112 is mounted for vertical movement along the stationary support post 128 to adjust for various sizes and diameters of objects to be engraved. The first support assembly 112 includes a first bracket 170 which is slidably mounted to the stationary support post 128. As shown in FIGS. 1 and 2, the first bracket 170 includes an inner plate 172 and an outer plate 174, between which a pair of rollers 176 and 178 are arranged. In some embodiments, the rollers 176 and 178 may be V-slot wheels or rollers. The rollers 176 and 178 ride in and along tracks 180 and 182, respectively, formed in the stationary support post 128. An axle 184 extends through the roller 176 and interconnects the inner plate 172 to the outer plate 174. Likewise, an axle 186 extends through the roller 178 and also interconnects the inner plate 172 to the outer plate 174. Thus, the inner plate 172 and the outer plate 174 are "clamped" about the stationary support post 128 and are vertically movable along the stationary support post 128 (by the rollers 176, 178 rolling along the tracks 180, 182) to raise and lower the first support assembly 112 on the stationary support post 128. Specifically, the inner plate 172 mounts and supports the driven wheels 116, the motor assembly 120 and a spring-loaded clamp 188 of the first support assembly 112. The spring-loaded clamp 188 is provided to secure an object to be engraved against the driven wheels 116 as is described in more detail hereinbelow.

Figure 5:
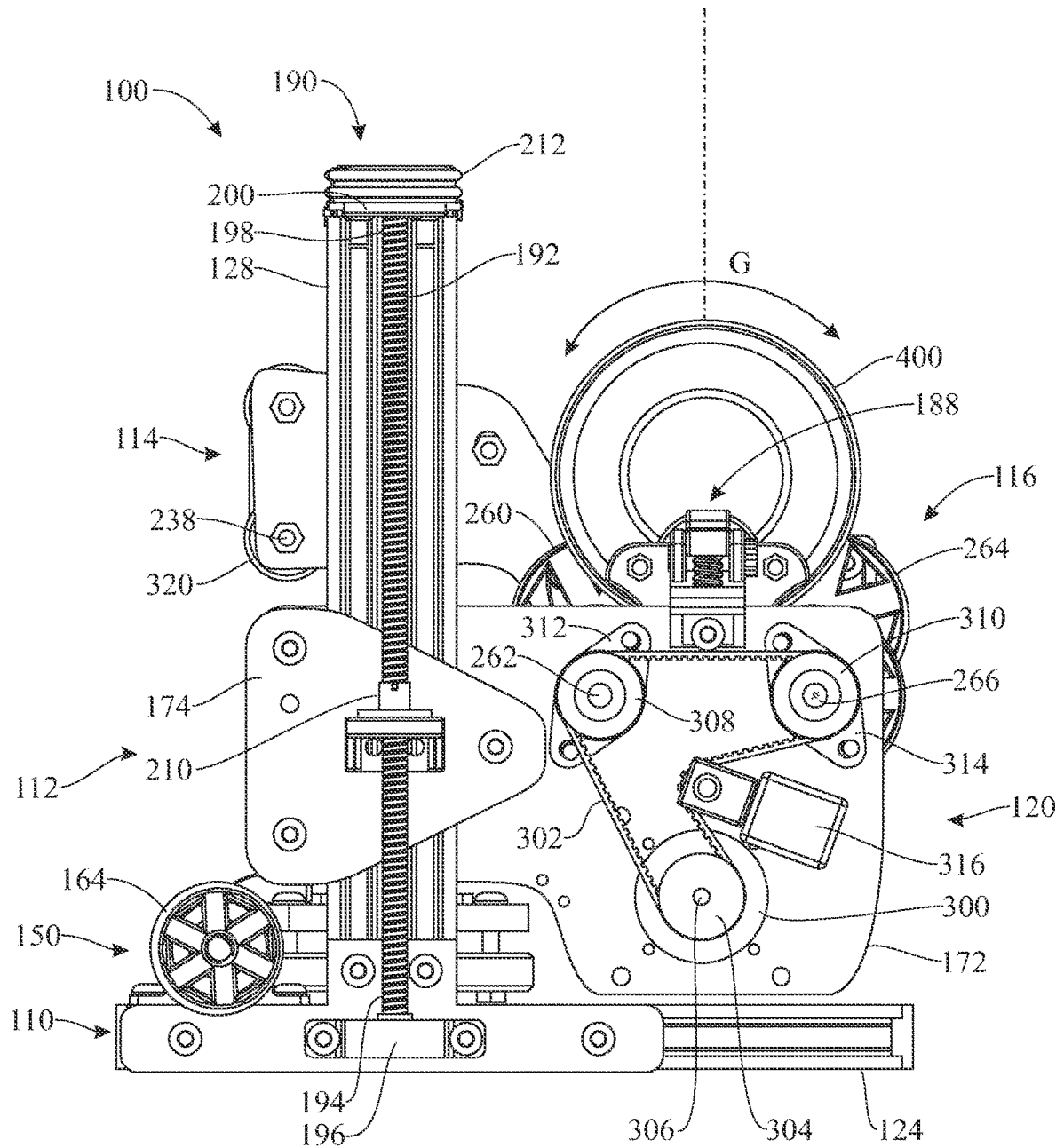
FIG. 5 presents a side elevation view of the rotary laser engraving device of FIG. 1, illustrating a drive assembly associated with the first support assembly of the laser engraving device.

In order to move the first support assembly 112 on the stationary support post 128, the rotary laser engraving device 100 includes a first vertical adjustment mechanism 190. The first vertical adjustment mechanism 190 of the present embodiment includes a first vertical lead screw 192. As shown in FIGS. 1 and 5, the first vertical lead screw 192 is supported at a first or lower end 194 by a pillow block bearing 196 affixed to the first anchor plate 134 and at a second end 198 by a pillow block bearing 200 affixed to a top plate 202 which in turn is affixed to a top end 204 of the stationary support post 128. Bolts 206 secure the pillow block bearing 196 to the first anchor plate 134 while bolts 208 secure the top plate 202 to the top end 204 of the stationary support post 128. A translational, internally-threaded anti-backlash nut or drive collar 210 is affixed to the outer plate 174 of the first bracket 170 such that rotation of the first vertical lead screw 192 within the pillow block bearings 196 and 200 causes the internally threaded drive collar 210, and thus the first bracket 170 and first support assembly 112, to translate vertically along the first vertical lead screw 192 to thereby adjust the height of the pair of driven rollers 116 of the first support assembly 112. A second adjustment wheel or knob 212 is affixed to the first vertical lead screw 192 to facilitate rotating the first vertical lead screw 192 to thereby adjust the height of the first support assembly 112.

As with the glide plate 140 described hereinabove, the first support assembly 112 may include additional wheels positioned between the inner plate 172 and the outer plate 174 of the first bracket 170 to stabilize the movement of the first bracket 170 along the stationary support post 128.

Turning now to the second support assembly 114, similarly to the first support assembly 112 and as shown in FIG. 1, the second support assembly 114 generally includes a second bracket 220 having an inner plate 222 and an outer plate 224. The inner plate 222 and the outer plate 224 are spaced apart from one another, and rollers 226 and 228 are arranged between the inner and outer plates 222 and 224. The rollers 226 and 228 ride in and along respective tracks 230 and 232 formed in the movable support post 130. In some embodiments, the rollers 226 and 228 may be V-slot wheels or rollers. Axles 234 and 236 extend through the rollers 226 and 228, respectively, and secure the inner plate 222 to the outer plate 224 to thereby clamp the second support assembly 114 about the movable support post 130. A third axle 238 may support a third roller 320 (FIG. 5), to further stabilize the second bracket 220 on the movable support post 130. The second support assembly 114 may further include a stop member or heel plate 119, extending generally between and above the pair of free rollers 118, for purposes that will be hereinafter described. The heel plate 119 may be disconnectably secured to the inner plate 222, such as, but not limited to, by a thumb screw 119a (FIG. 2).

In order to move the second support assembly 114 along the movable support post 130, the rotary laser engraving device 100 further includes a second vertical adjustment mechanism 240. The second vertical adjustment mechanism 240 of the present embodiment includes a second vertical lead screw 242. As shown in FIG. 6, the second vertical lead screw 242 is secured at a first end 244 in a pillow block bearing 246 affixed to the glide plate 140 and at a second end 248 in a pillow block bearing 250 secured to a top plate 252 mounted on a top end 254 of the movable support post 130. The second vertical adjustment mechanism 240 further includes a translational, internally-threaded anti-backlash nut or drive collar 256 threadingly mounted for movement along the second vertical lead screw 242 and secured to the outer plate 224. Thus, movement of the threaded drive collar 256 vertically along the second vertical lead screw 242, responsively to rotation of the second vertical lead screw 242, moves the second support assembly 114, including the free rollers 118, vertically with respect to the frame assembly 110. A third adjustment wheel or knob 258 is provided to facilitate rotating the second vertical lead screw 242 to vertically adjust the height of the free rollers 118.

Referring specifically to FIGS. 2 and 6, the driven rollers 116 of the first support assembly 112 include an inner driven roller 260 mounted on an inner axle 262 and an outer driven roller 264 mounted on an outer axle 268. Likewise, as shown in FIGS. 1 and 2, the free rollers 118 of the second support assembly 114 include an inner free roller 268 mounted on an inner axle 270 and an outer free roller 272 mounted on an outer axle 274. The inner and outer axles 270 and 272 extend through the inner plate 172 and are rotatably supported thereon by respective pillow block bearings 276 and 278 affixed to the inner plate 172. Similarly, the inner and outer axles 270 and 274 extend through the inner plate 222 and are rotatably supported thereon by respective pillow block bearings 280 and 282 affixed to the inner plate 222.

As shown in FIG. 2, the inner and outer axles 262 and 268 supporting the inner and outer driven rollers 260 and 264, respectively, define respective axes a-a and a'-a' and the inner and outer axles 270 and 274 supporting the inner and outer free rollers 268 and 272, respectively, define respective axes b-b and b'-b'. The axes a-a and a'-a' and the axes b-b and b'-b' are parallel to each other and parallel to a central axis c-c defined by and extending longitudinally (i.e. in the longitudinal direction y) through an object to be engraved. It should be noted that the pair of driven rollers 116 and the pair of free rollers 118 are transversely offset from the central bar 122 placing the central axis c-c of the object to be engraved offset a distance D from a central longitudinal axis e-e of the central bar 122.

Figure 3:
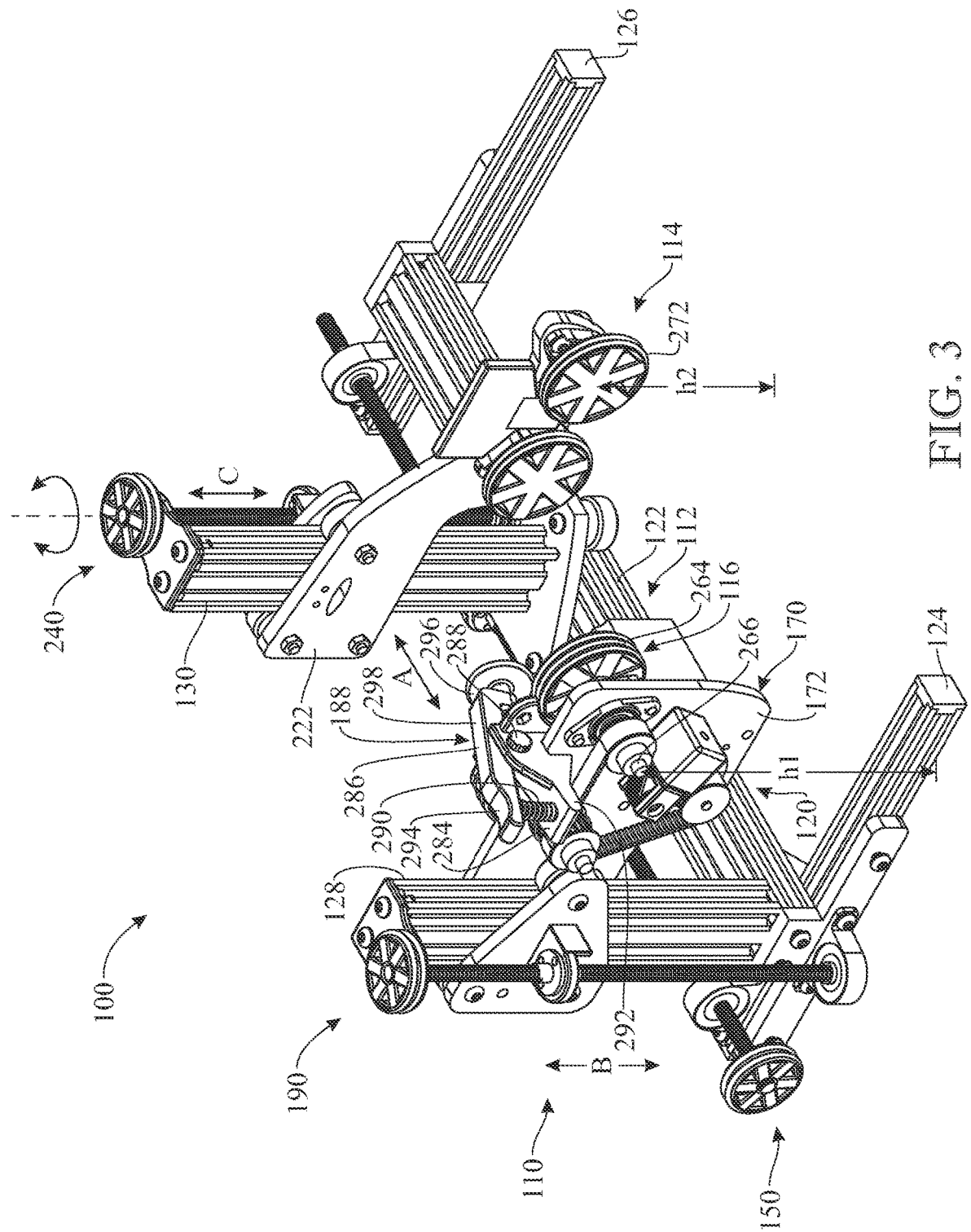
FIG. 3 presents a top, front isometric view, similar to FIG. 1, of the rotary laser engraving device with the second support assembly moved horizontally closer to the first support assembly.
Figure 4:
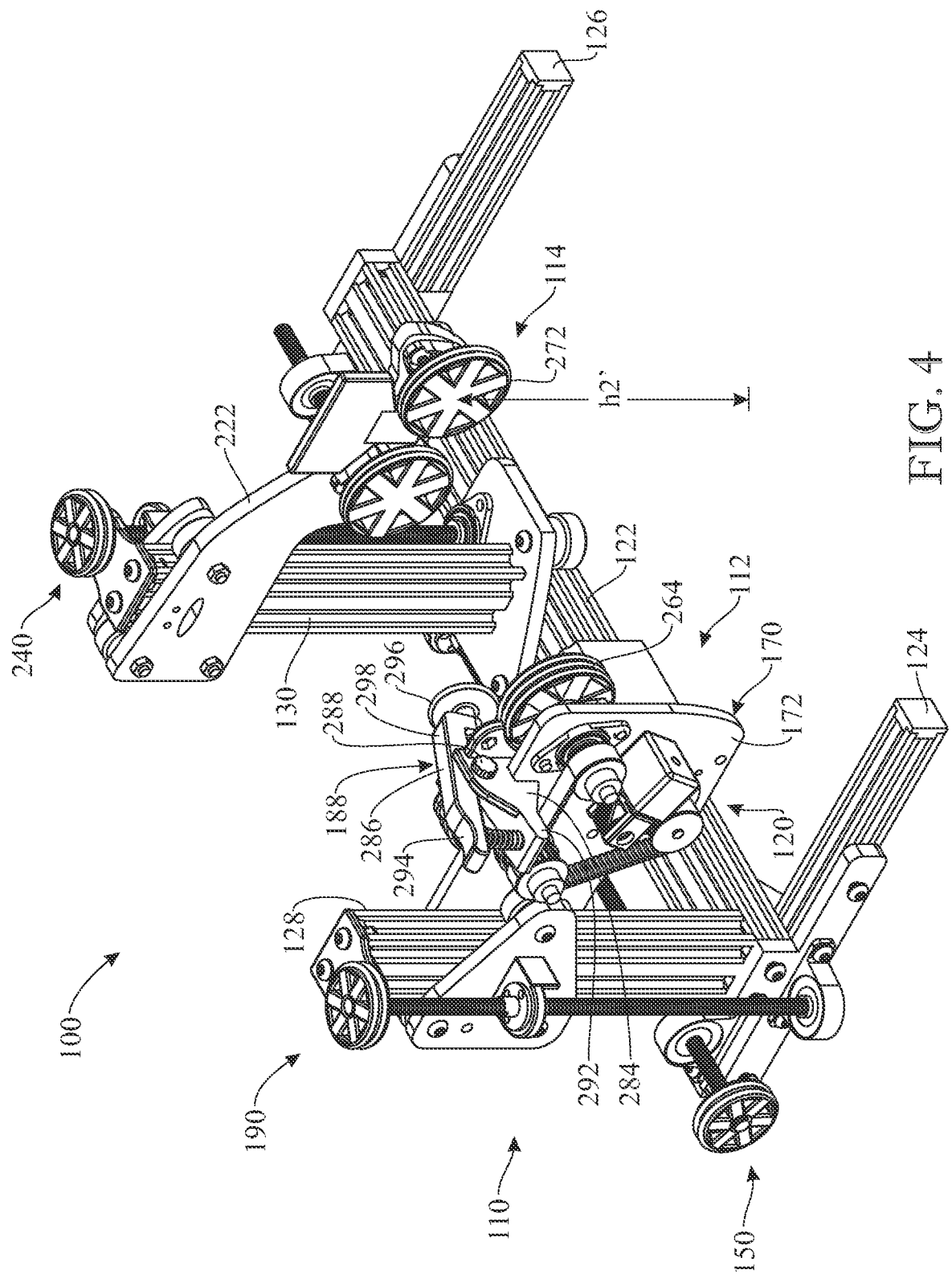
FIG. 4 presents a top, front isometric view, similar to FIG. 3, of the rotary laser engraving device with the second support assembly adjusted fully vertically relative to the first support assembly.

Referring for the moment to FIGS. 3 and 4, the second support assembly 114 is movable along the length of the central bar 122 in the longitudinal direction y, as indicated by arrow A, towards and away from the first support assembly 112 by operation of the longitudinal adjustment mechanism 150. The first support assembly 112 is moved in the vertical direction z, as indicated by arrow B, to a predetermined or selected height h1 on the stationary support post 128 by the first vertical adjustment mechanism 190. In the illustration of FIG. 3, the height h1 is the distance between one of the axes of the pair of driven rollers 116, for example the axis a'-a' of the outer axle 266 of the outer driven roller 264, and the ground or platform the rotary laser engraving device 100 is positioned on. It should be noted that the first vertical adjustment mechanism 190 is operable to vary the height h1 as needed.

The second support assembly 114 is illustrated in a first position or height h2 on the movable support post 130 (FIG. 3) and in a second position h2' higher than the first position along the movable support post 130 (FIG. 4). In the first and second illustrated positions, the heights h2 and h2' are the distances between the outer axle 274 of the outer free roller 272 and the ground or platform the rotary laser engraving device 100 is positioned on (FIG. 4). As noted hereinabove, the height of the second support assembly 114 is adjusted in the vertical direction z, also indicated by arrows C, by operation of the second vertical adjustment mechanism 240. It should be noted that the measurements of the various heights, for example heights h1, h2, h2', etc. are relative and are given to illustrate that the first and second vertical adjustment mechanisms 190 and 204 are independently adjustable and vary the heights of the first and second support assemblies 112 and 114 on the respective stationary support post 128 and the movable support post 128 in order to adjust for various sizes and/or diameters of the objects to be engraved.

With continued reference to FIG. 3, and as noted hereinabove, the spring-loaded clamp 188 is mounted on the inner plate 172 of the first support assembly 112 and is provided to secure an object to be engraved against the pair of driven wheels 116. The spring-loaded clamp 188 generally includes a frame mount 284 fixedly secured to the inner plate 172 of the first bracket 170 and a movable top clamp 286 pivotally mounted on the frame mount 284 by a pivot pin 288. A compression spring 290 is provided between a first end 292 of the frame mount 284 and a first end 294 of the movable top clamp 286 to bias a clamp wheel 296, rotatably mounted on a second end 298 of the movable top clamp 286 opposite the first end 294, against an object to be engraved thereby securing the object to be engraved between the clamp wheel and the pair of driven wheels 116. It should be noted that the clamp wheel 296 rotates with the object to be engraved as the object to be engraved is rotated by the pair of driven wheels 116 as described in more detail herein below.

Referring now to FIG. 5, as noted hereinabove, in order to rotate the pair of driven rollers 116, and thus rotate the object to be engraved, for example, cup 400, the rotary laser engraving device 100 includes the motor assembly 120. The motor assembly 120 of the present embodiment is carried by the first bracket 170 and is raisable and lowerable along the first or stationary support post 128, and generally includes a motor 300 and a drive belt 302 drivingly connecting the motor 300 to the pair of driven rollers 116. Specifically, in some embodiments, the motor assembly 120 may include a motor drive pulley 304 mounted on a drive axle 306 of the motor 300, a first cog pulley 308 fixedly mounted on the inner axle 262 of the inner driven roller 260 and a second cog pulley 310 fixedly mounted on the outer axle 266 of the outer driven roller 264. The inner and outer axles 262 and 266 are rotatably supported on the inner plate 172 by respective mounting brackets 312 and 314. The drive belt 302 surrounds and connects the motor drive pulley 304 with the first and second cog pulleys 308 and 310 to rotate the pair of driven rollers 116, specifically the inner driven roller 260 and the outer driven roller 264. In a non-limiting example, the motor 300 is "hot-swappable" between NEMA 17 type motors or NEMA 23 type motors. A tensioner 316 is provided, and is engageable with the drive belt 302 to tension the drive belt 302 about the motor drive pulley 304, the first cog pulley 308 and the second cog pulley 310; in some embodiments, the tensioner 316 may be mounted to the inner plate 172. Thus, rotation of the motor 300 rotates the pair of driven rollers 116 to thereby rotate the cup 400 as it is engraved by an associated laser engraving device (not shown).

Turning to FIGS. 1-8, and initially with regard to FIG. 1, the use of the rotary laser engraving device 100 to mount and engrave an object, for example cup 400 (FIG. 6), will now be described. In the initial position or condition, as shown in FIG. 1, the second support assembly 114 may be arranged at the longitudinally farthest position from the first support assembly 112 along the central bar 122, and the first and second support assemblies 112 and 114, respectively, may be arranged at their lowest positions or heights with respect to the central bar 122.

Figure 7:
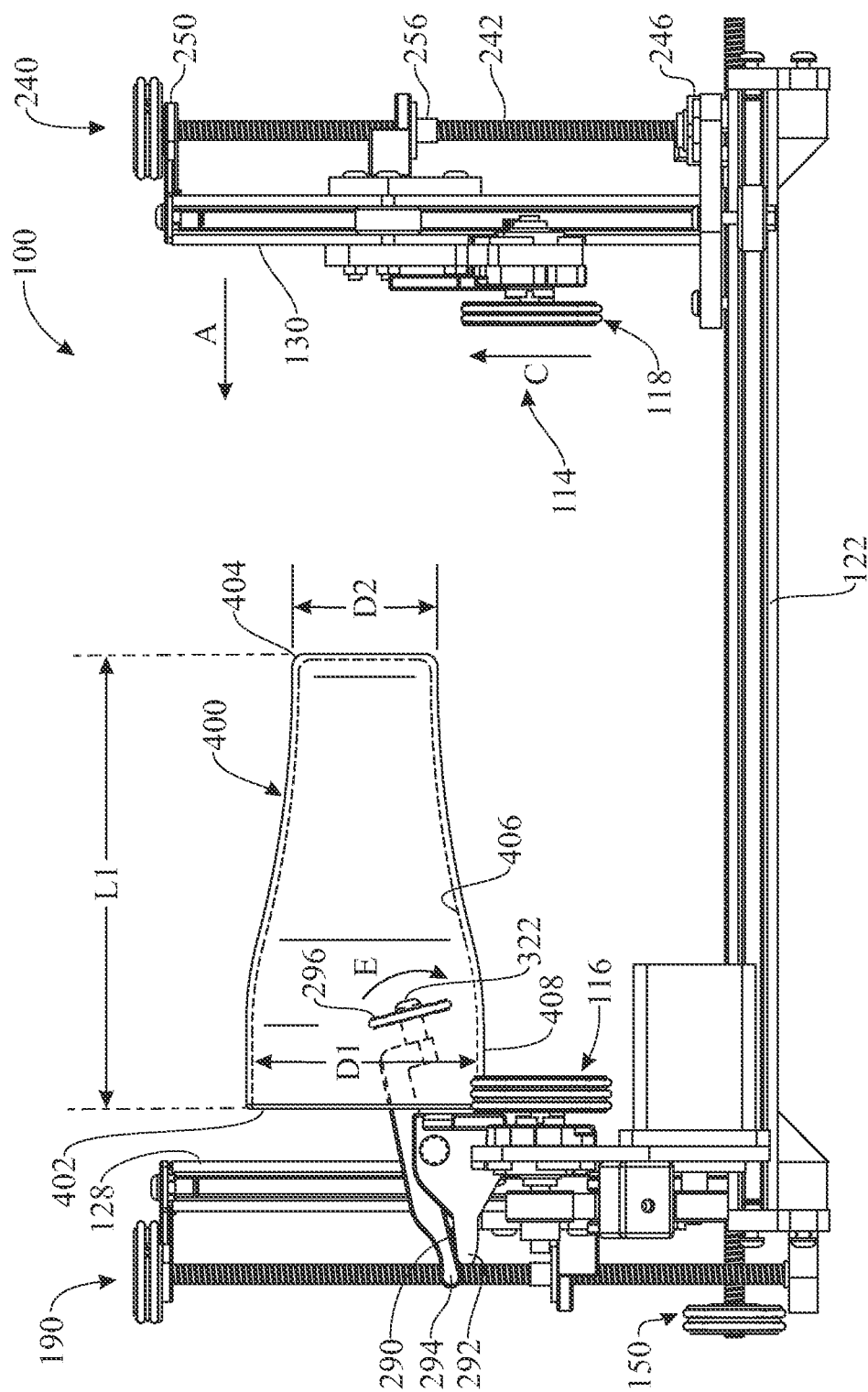
FIG. 7 presents a front elevation view of the rotary laser engraving device of FIG. 1, with a first end of the object to be engraved positioned on driven rollers of the first support assembly.

As shown in FIGS. 6 and 7, the cup 400 to be laser engraved includes a first or open end 402 having a first diameter D1 and a second or closed end 404 having a second diameter D2 which, in this example, is less than D1. The cup 400 also has a length L1. In order to accommodate the dimensions of the cup 400, the rotary laser engraving device 100 may be pre-adjusted to facilitate mounting the cup 400 on the rotary laser engraving device 100. Referring to FIGS. 1 and 2, the longitudinal adjustment mechanism 150 may be operated to move the movable support post 130, and thus the second support assembly 114, towards the first support assembly 112 in the longitudinal direction x (also indicated by arrow A) to pre-position the second support assembly 114 to an estimated size of the cup 400 (shown in phantom in FIG. 2).

As best shown in FIG. 3, in a specific method, the second support assembly 114 may also be pre-positioned. The first support assembly 112 may be raised in the vertical direction z (as indicated by arrow B) to the desired height by operation of the first vertical adjustment mechanism 190 to pre-position the pair of driven rollers 116 and the spring-loaded clamp 188 in a position to receive the open first end 402 of the cup 400. The second vertical adjustment mechanism 240 may be operated to move the second support assembly 114 in the vertical direction z (as indicated by arrow C) from the initial lower position (FIG. 3) to a second higher position (FIG. 4).

Figure 8:
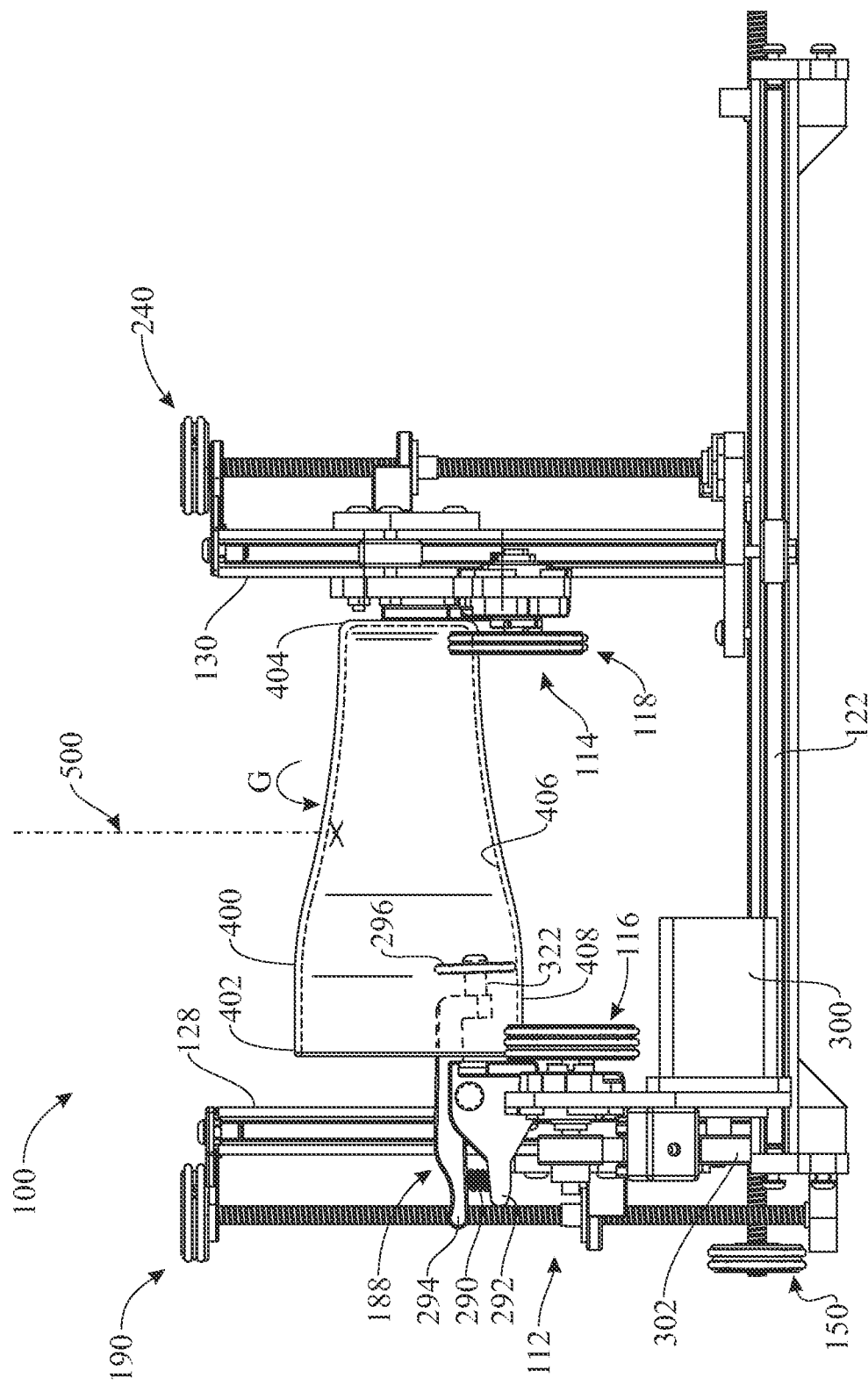
FIG. 8 presents a front elevation view, similar to FIG. 7, of the rotary laser engraving device of FIG. 1, with the object to be engraved secured in the first support assembly and the second support assembly moved horizontally towards the first support assembly to position a second end of the object to be engraved on free rollers of the second support assembly.

With regard to FIGS. 7 and 8, the cup 400 is placed on the rotary laser engraving device 100. This step can be carried out, for instance and without limitation, with the first and second support assemblies 112 and 114 arranged in the initial position of FIG. 1, as shown, or with the first and second support assemblies 112 and 114 pre-positioned relative to one another as described heretofore. To place the cup 400 on the device, the operator may manually operate the spring-loaded clamp 188 by pressing the first ends 292 and 294 towards one another, thereby pivoting the top clamp 286 about the pivot pin 288 and compressing the spring 290, to separate the clamp wheel 296 from the pair of driven rollers 116 (i.e. to open the spring-loaded clamp 188). As shown in FIG. 7, with the spring-loaded clamp 188 in the open position, the first open end 402 of the cup 400 is then positioned on the pair of driven rollers 116 and the top clamp 286 is inserted into the cup 400 through the open first end 402. The user may then release the first ends 292 and 294, allowing top clamp 286 to automatically pivot in the direction of arrow E, by action of the compression spring 290, causing the clamp wheel 296 to eventually contact and engage an inner side or surface 406 of the cup 400, as shown in FIG. 8. As shown, the clamp wheel 296 of the spring-loaded clamp 188 is mounted on an axle 322 of the spring-loaded clamp 188 and, in engaging the inner surface 406 of the cup 400, the clamp wheel 296 can both bias and retain an outer surface 408 of the cup 400 against the pair of driven rollers 116 and also roll along the inner surface 406 of the cup 400. The cup 400 is thereby positioned on or loaded in the first support assembly 112 in a condition to be rotated by the motor assembly 120 and the pair of driven rollers 116.

Thereafter, the second support assembly 114 is moved towards the cup 400 in the direction of arrow A by the longitudinal adjustment mechanism 150, and the pair of free rollers 118 of the second support assembly 114 are raised by the second vertical adjustment mechanism in the direction of arrow C to contact the closed second end 404 of the cup 400 such that the pair of free rollers 118 support the second end 404 of the cup 400. Furthermore, in cases where the cup or object to be engraved has an irregular or odd shape, the heel plate 119 may optionally be mounted to the inner plate 222 (e.g., via the thumb ring 119a) and may provide a longitudinal stop which contributes to prevent "walking" of the cup or item as the item is rotated; in other cases, such as if the object to be engraved is particularly long (e.g., a baseball bat), the device operator or user may choose not to mount the heel plate 119, to allow the object to be engraved to extend beyond the pair of free rollers 118. In summary, the rotary laser engraving device 100 of the present disclosure is configured to fully and firmly support a wide variety of objects (e.g., the cup 400) as the object is rotated by the pair of driven rollers 116.

As best shown in FIGS. 5 and 8, once the cup 400 has been properly positioned and secured to the rotary laser engraving device 100, the motor 300 can be operated to rotate the drive belt 302 and thus rotate the pair of driven rollers 116. Rotation of the pair of driven rollers 116 rotates the cup 400 within the rotary laser engraving device 100 and about a central longitudinal axis of the cup 400 as indicated by arrow G, while the cup 400 remains rotatably clamped by the clamp wheel 296. Thereafter, a laser associated with the rotary laser engraving deceive 100 is actuated to project an engraving level laser beam 500 onto the cup 400 to engrave the desired images, logos, etc. into the cup 400.

Thus, the disclosed rotary laser engraving device 100 provides a novel and useful device having a multitude of adjustments to support various shapes and sizes of objects to be laser engraved.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A rotary laser engraving device for retaining and rotating objects to be engraved, the rotary laser engraving device comprising:

a frame;
a first support assembly mounted on the frame and including a first set of rollers for supporting a first end of an object to be engraved;
a second support assembly mounted on the frame and including a second set of rollers for supporting a second end of the object to be engraved;
a longitudinal adjustment mechanism carried by the frame and configured to move at least one of the first support assembly and second support assembly in a longitudinal direction along the frame to vary a longitudinal separation between the first set of rollers and the second set of rollers;
at least one vertical adjustment mechanism carried by the frame and configured to move at least one of the first support assembly and second support assembly vertically along the frame to vary a vertical separation between the first set of rollers and the second set of rollers;
wherein the at least one vertical adjustment mechanism comprises a vertical adjustment mechanism carried by the frame and configured to move the first support assembly along the first support post; and
a motor assembly engageable with the first set of rollers to rotate the first set of rollers to rotate the object to be engraved.

2. The device of claim 1, wherein the first set of rollers and second set of rollers are arranged facing one another, and further wherein the rollers of the first and second sets of rollers are rotatable about respective rotation axes which are parallel to one another.

3. The device of claim 1, wherein the at least one vertical adjustment mechanism comprises at least one spring-loaded clamp configured to bias the object to be engraved against at least one of the first and second sets of rollers.

4. The device of claim 3, wherein the at least one spring-loaded clamp comprises a clamp arm pivotable relative to and spring-biased towards said at least one of the first and second sets of rollers, wherein the clamp arm carries a clamp wheel configured to abut against and roll on the object to be engraved.

5. The device of claim 1, wherein the frame comprises a central bar arranged in the longitudinal direction, a first support post extending vertically upward relative to the central bar and carrying the first support assembly, and a second support post extending vertically upward relative to the central bar and carrying the second support assembly, wherein at least one of the first support post and the second support post is longitudinally movable along the central bar to vary the longitudinal separation between the first set of rollers and the second set of rollers.

6. The device of claim 1, wherein the motor assembly is movable along the first support post jointly with the first support assembly.

7. The device of claim 1, wherein the vertical adjustment mechanism configured to move the first support assembly comprises a lead screw and a threaded collar, wherein the lead screw is arranged vertically, and wherein the threaded collar is threaded to the lead screw and affixed to the first support assembly and is configured to translate vertically jointly with the first support assembly upon rotation of the lead screw.

8. The device of claim 1, wherein the vertical adjustment mechanism configured to move the first support assembly comprises a spring-loaded clamp configured to bias the object to be engraved against the first set of rollers.

9. The device of claim 8, wherein the spring-loaded clamp comprises a clamp arm pivotable relative to and spring-biased towards the first set of rollers, wherein the clamp arm carries a clamp wheel configured to abut against and roll on the object to be engraved.

10. The device of claim 5, wherein the first support post is non-longitudinally movable relative to the central bar, and the second support post is longitudinally movable along the central bar.

11. The device of claim 10, wherein the longitudinal adjustment mechanism comprises a lead screw arranged in the longitudinal direction and a threaded collar threaded to the lead screw, wherein the threaded collar is affixed to the second support post and configured to translate in the longitudinal direction jointly with the second support post upon rotation of the lead screw.

12. The device of claim 10, wherein the at least one vertical adjustment mechanism comprises a vertical adjustment mechanism carried by and longitudinally movable jointly with the second support post and configured to move the second support assembly along the second support post.

13. The device of claim 12, wherein the vertical adjustment mechanism carried by the second support post comprises a lead screw and a threaded collar, wherein the lead screw is arranged vertically, and wherein the threaded collar is threaded to the lead screw and affixed to the second support assembly and is configured to translate vertically jointly with the second support assembly upon rotation of the lead screw.

14. The device of claim 5, wherein the frame further comprises a first transverse bar and a second transverse bar arranged in spaced-apart relationship and extending perpendicularly to the central bar.

15. The device of claim 14, wherein the first and second transverse bars are configured to stably rest on a horizontal surface.

16. The device of claim 1, wherein the motor assembly comprises a motor and a drive belt engageable with the motor, the drive belt engaging and rotating the first set of rollers.

17. The device of claim 16, the motor assembly further comprising a tensioner to tension the drive belt against the first set of rollers.

18. A rotary laser engraving device for retaining and rotating objects to be engraved, the rotary laser engraving device comprising:
- a frame, comprising a central bar arranged in a longitudinal direction, a first support post extending vertically upward relative to the central bar, and a second support post extending vertically upward relative to the central bar;
- a first support assembly carried by the first support post and including a first set of rollers for supporting a first end of an object to be engraved;
- a second support assembly carried by the second support post and including a second set of rollers for supporting a second end of the object to be engraved;
- a longitudinal adjustment mechanism carried by the frame and configured to move at least one of the first support post and the second support post in the longitudinal direction along the central bar to vary a longitudinal separation between the first set of rollers and the second set of rollers;
- at least one vertical adjustment mechanism carried by the frame and configured to move at least one of the first support assembly and second support assembly vertically along the first support post and second support post, respectively, to vary a vertical separation between the first set of rollers and the second set of rollers; wherein the at least one vertical adjustment mechanism comprises a vertical adjustment mechanism carried by the frame and configured to move the first support assembly along the first support post; and
- a motor assembly engageable with the first set of rollers to rotate the first set of rollers to rotate the object to be engraved.

19. A rotary laser engraving device for retaining and rotating objects to be engraved, the rotary laser engraving device comprising:
- a frame, comprising a central bar arranged in a longitudinal direction, a first support post extending vertically upward and non-longitudinally movable relative to the central bar, and a second support post extending vertically upward and longitudinally movable relative to the central bar;
- a first support assembly carried by the first support post and including a first set of rollers for supporting a first end of an object to be engraved;
- a second support assembly carried by the second support post and including a second set of rollers for supporting a second end of the object to be engraved;
- a longitudinal adjustment mechanism carried by the frame and configured to move the second support post in the longitudinal direction along the central bar to vary a longitudinal separation between the first set of rollers and the second set of rollers;
- at least one vertical adjustment mechanism carried by the frame and configured to move at least one of the first support assembly and second support assembly vertically along the first support post and second support post, respectively, to vary a vertical separation between the first set of rollers and the second set of rollers; wherein the at least one vertical adjustment mechanism comprises a vertical adjustment mechanism carried by the frame and configured to move the first support assembly along the first support post; and
- a motor assembly engageable with the first set of rollers to rotate the first set of rollers to rotate the object to be engraved.

* * * * *